(12) United States Patent
Wierzba

(10) Patent No.: US 9,440,576 B1
(45) Date of Patent: Sep. 13, 2016

(54) TRAILER ASSEMBLY

(71) Applicant: Jack Wierzba, Eden, NY (US)

(72) Inventor: Jack Wierzba, Eden, NY (US)

( * ) Notice: Subject to any disclaimer, the term of this patent is extended or adjusted under 35 U.S.C. 154(b) by 0 days.

(21) Appl. No.: 14/641,672

(22) Filed: Mar. 9, 2015

(51) Int. Cl.
*B60P 3/08* (2006.01)
*B60P 3/10* (2006.01)

(52) U.S. Cl.
CPC ............ *B60P 3/08* (2013.01); *B60P 3/1033* (2013.01); *B60P 3/1066* (2013.01); *B60P 3/1058* (2013.01); *B60P 3/1091* (2013.01)

(58) Field of Classification Search
CPC ..... B60P 3/1008; B60P 3/1033; B60P 3/105; B60P 3/1058; B60P 3/1091
See application file for complete search history.

(56) References Cited

U.S. PATENT DOCUMENTS

| | | | |
|---|---|---|---|
| 3,870,339 A * | 3/1975 | Goff | B60P 3/1033 280/414.1 |
| 3,970,203 A | 7/1976 | Watson, Jr. | |
| 4,188,056 A * | 2/1980 | Watson | B60P 3/1041 280/414.1 |
| 4,932,830 A * | 6/1990 | Woodburn | B60P 3/08 280/414.1 |
| D344,834 S | 3/1994 | Ries | |
| 5,664,516 A * | 9/1997 | Breeden | B63B 23/34 114/259 |
| 5,704,756 A * | 1/1998 | Marteney | B60P 3/10 414/462 |
| 5,772,388 A | 6/1998 | Clark | |
| 5,863,173 A * | 1/1999 | Bremner | B60P 3/08 280/414.1 |
| 6,203,264 B1 | 3/2001 | Combs, Sr. | |
| 6,217,053 B1 | 4/2001 | Forsythe et al. | |
| 7,143,713 B1 * | 12/2006 | Richardson | B60P 3/1033 114/344 |
| 7,547,032 B1 | 6/2009 | Roberts | |

\* cited by examiner

*Primary Examiner* — Joseph Rocca
*Assistant Examiner* — Marc A Scharich

(57) ABSTRACT

A trailer assembly for simultaneously transporting a personal watercraft and a pontoon includes a trailer that may be towed. A first support is hingedly coupled to the trailer and the first support may support a pontoon. A second support is coupled to the trailer and the second support may support a personal watercraft beneath the pontoon.

8 Claims, 5 Drawing Sheets

TRAILER ASSEMBLY

BACKGROUND OF THE DISCLOSURE

Field of the Disclosure

The disclosure relates to trailer devices and more particularly pertains to a new trailer device for simultaneously transporting a personal watercraft and a pontoon.

SUMMARY OF THE DISCLOSURE

An embodiment of the disclosure meets the needs presented above by generally comprising a trailer that may be towed. A first support is hingedly coupled to the trailer and the first support may support a pontoon. A second support is coupled to the trailer and the second support may support a personal watercraft beneath the pontoon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
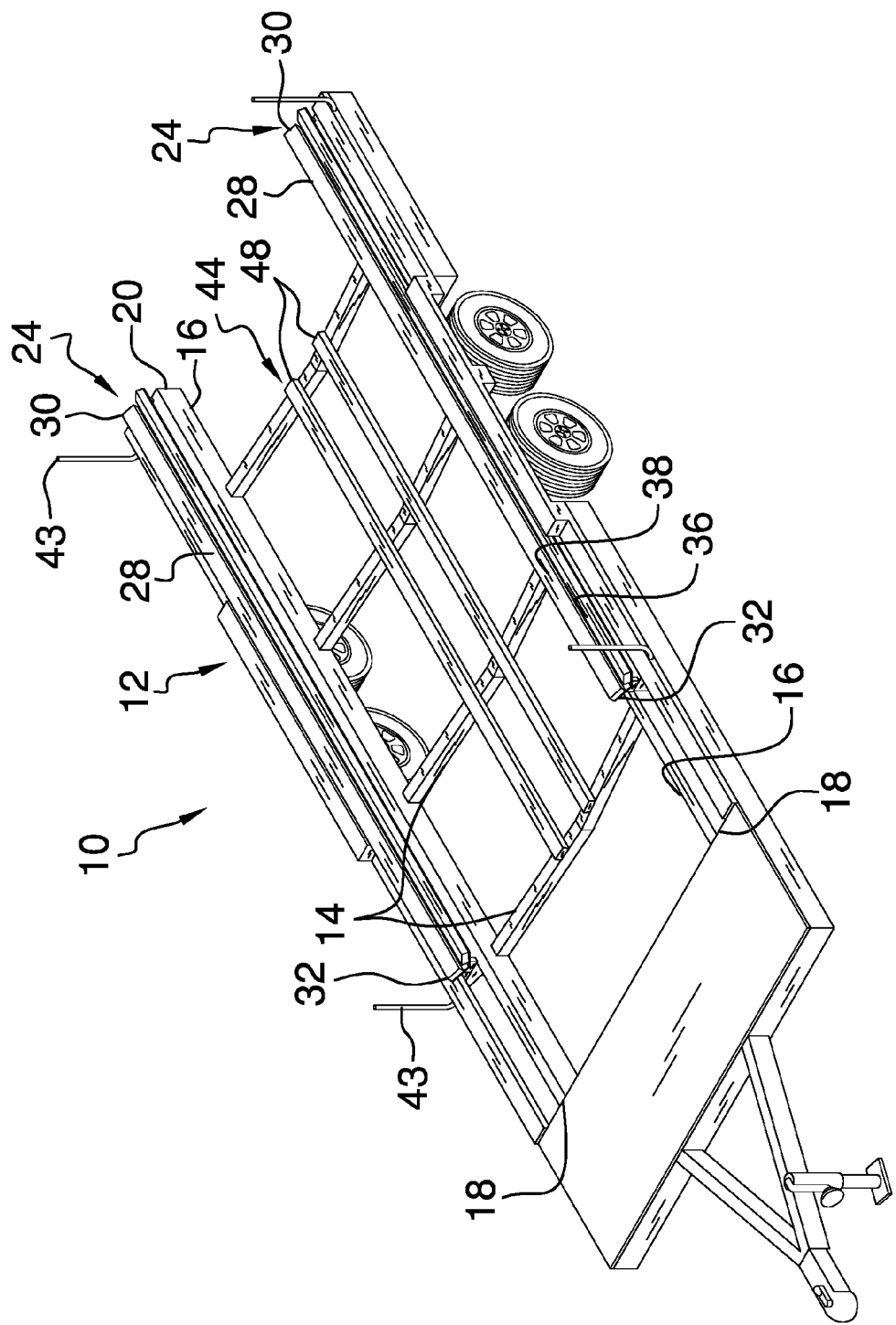
FIG. 1 is a top perspective view of a trailer assembly according to an embodiment of the disclosure.
Figure 2:
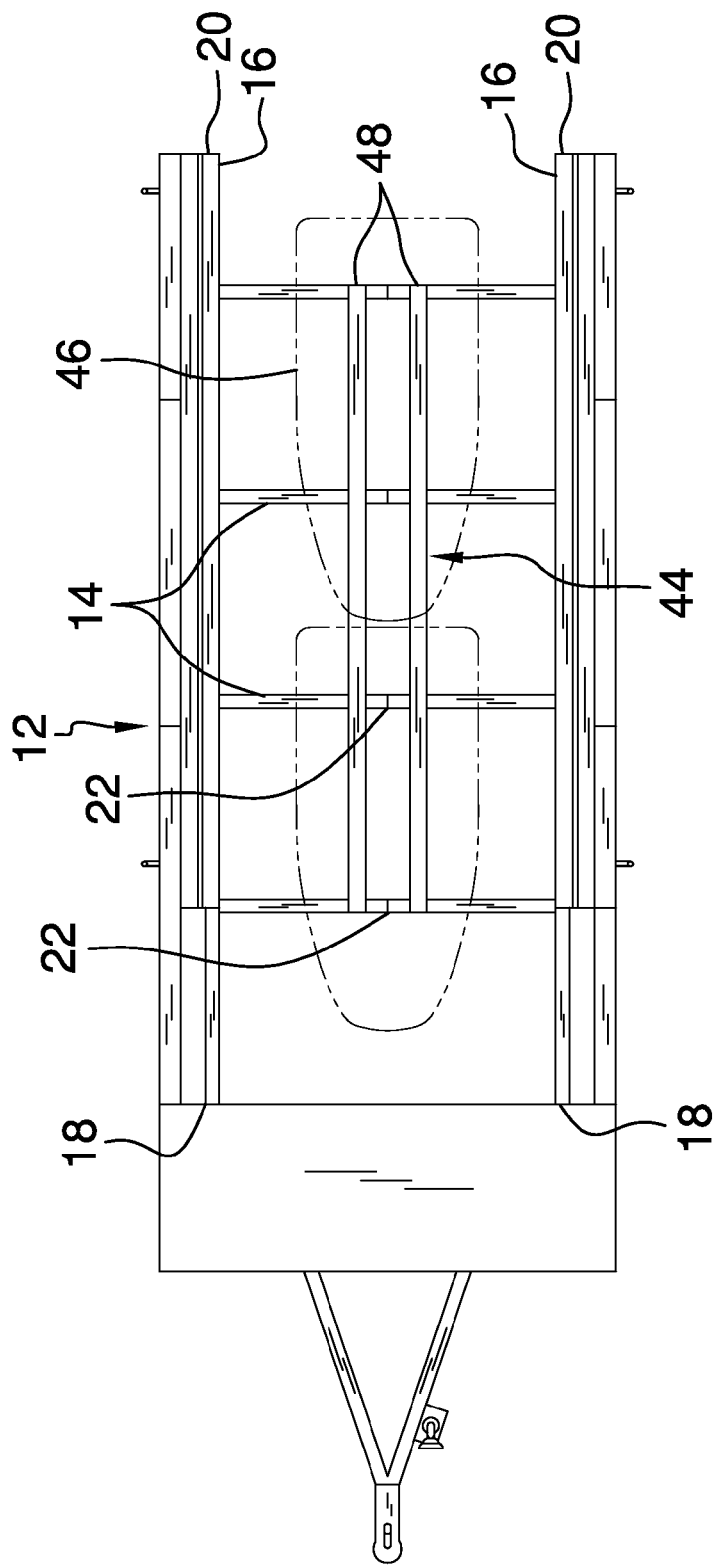
FIG. 2 is a top view of an embodiment of the disclosure.
Figure 3:
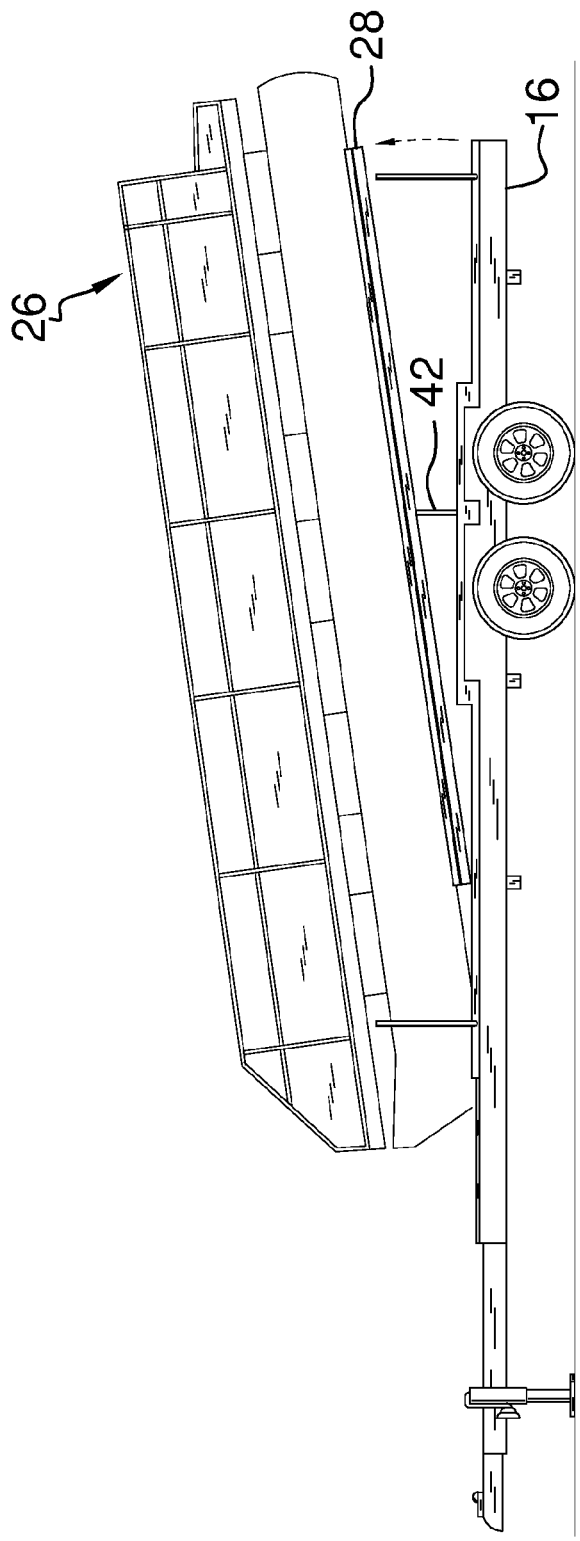
FIG. 3 is a left side view of an embodiment of the disclosure in a lifted position.
Figure 4:
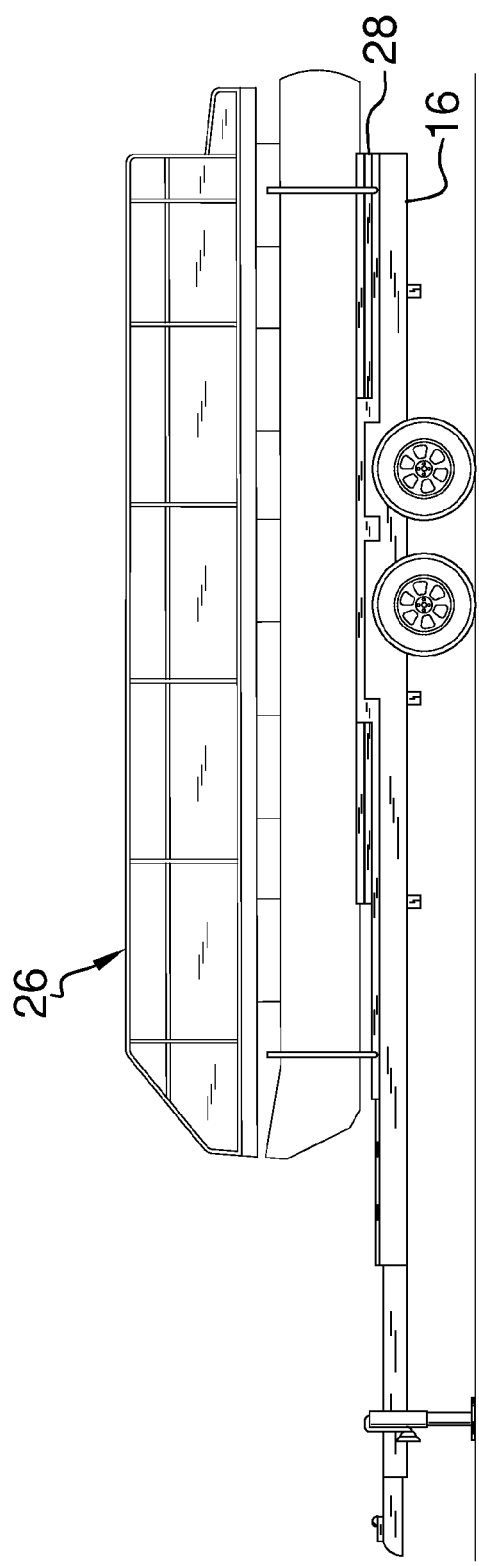
FIG. 4 is a left side view of an embodiment of the disclosure in a lowered position.
Figure 5:
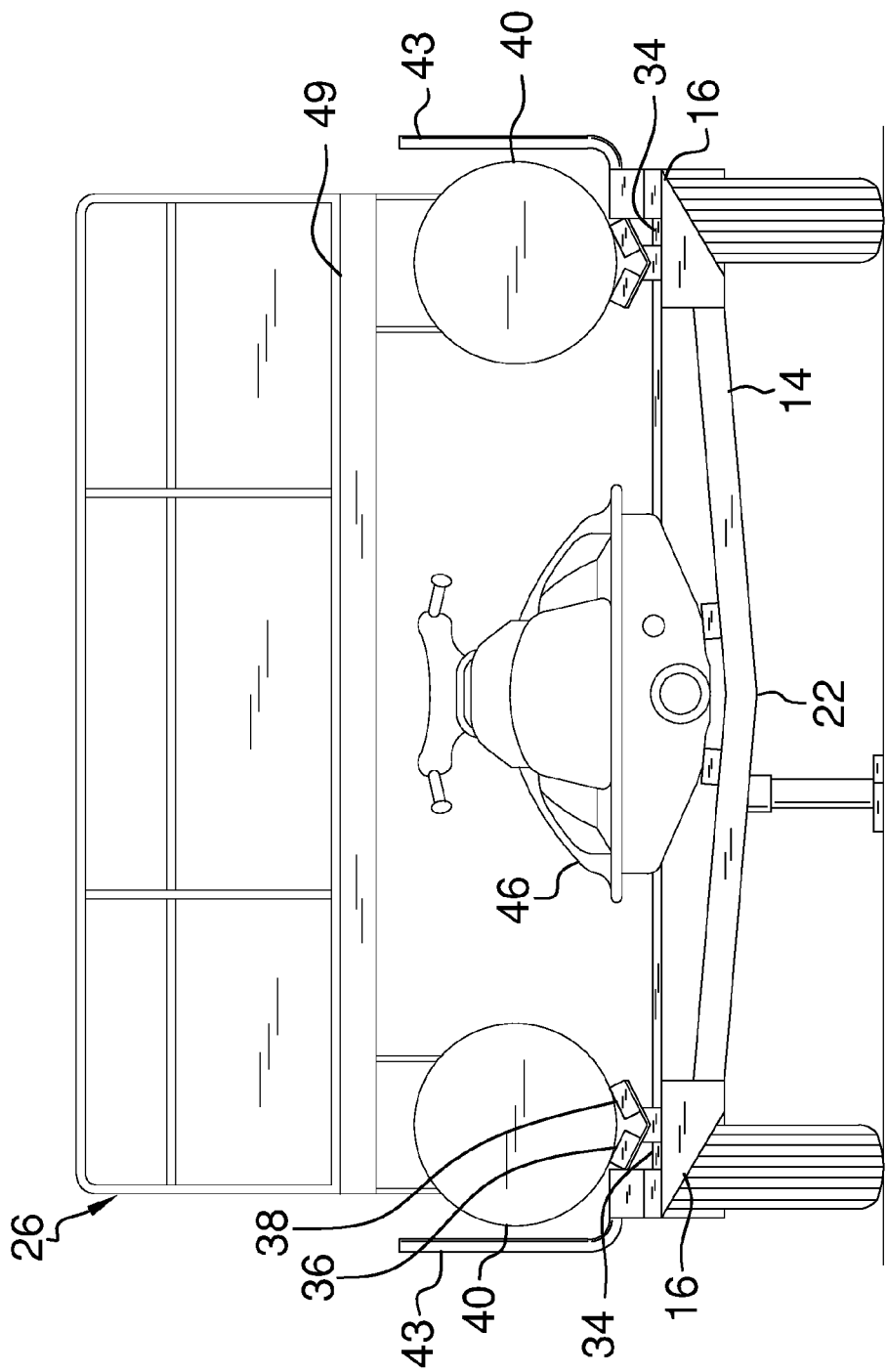
FIG. 5 is a back view of an embodiment of the disclosure.

With reference now to the drawings, and in particular to FIGS. 1 through 5 thereof, a new trailer device embodying the principles and concepts of an embodiment of the disclosure and generally designated by the reference numeral 10 will be described.

As best illustrated in FIGS. 1 through 5, the trailer assembly 10 generally comprises a trailer 12 that may be towed. The trailer 12 includes a plurality of lateral members 14 coupled to and extending between a pair of longitudinal members 16 and each of the longitudinal members 16 has a front end 18 and a back end 20. The lateral members 14 are spaced apart from each other and distributed between the front end 18 and the back end 20. Each of the lateral members 14 has a bend 22 thereon and the bend 22 is centrally positioned on the lateral members 14 such that the each of the lateral members 14 has a V-shape. Each of the lateral members 14 is oriented such that the bend 22 extends downwardly between the longitudinal members 16.

A first support 24 is hingedly coupled to the trailer 12 and the first support 24 may support a pontoon 26. The pontoon 26 may be a pontoon boat of any conventional design. The first support 24 comprises a pair of rails 28 and each of the rails 28 has a first end 30 and a second end 32. Each of the rails 28 is elongated between the first end 30 and the second end 32 and each of the longitudinal members 16 has a top side 34. The top side 34 of each of the longitudinal members 16 has one of the rails 28 positioned thereon. The first ends 30 are aligned with the back end 20 and the second ends 32 are positioned at a point that is closer to the front end 18 than the back end 20. The second end 32 of each of the rails 28 is hingedly coupled to the top side 34.

Each of the rails 28 includes a first member 36 and a second member 38, and the first member 36 and the second member 38 are attached to each other. The first member 36 and the second member 38 are oriented at an angle with each other such that the first member 36 and the second member 38 form a V-shape. The first member 36 and the second member 38 of one of the rails 28 may have one of a pair of floats 40 of the pontoon 26 positioned thereon. Additionally, the first member 36 and the second member 38 of one of the rails 28 may have the other one of the pair of floats 40 of the pontoon 26 positioned thereon.

Each of the rails 28 is positionable in a lifted position such that the first end 30 of the rails 28 is spaced from the top side 34 of the longitudinal members 16 and each of the rails 28 is positionable in a lowered position having the rails 28 abutting the top side 34. A pair of lifts 42 is provided. One of the lifts 42 is coupled between one of the lateral members 14 and one of the rails 28 and one of the lifts 42 is coupled between one of the lateral members 14 and the other one of the rails 28. Each of the lifts 42 urges the rails 28 between the lifted position and the lowered position and each of the lifts 42 may comprise a hydraulic cylinder or the like.

A plurality of guides 43 is provided and each of the guides 43 is coupled to and extends upwardly from the longitudinal members 16. Each of the longitudinal members 16 has a guide 43 positioned adjacent to the back end 20 and each of the longitudinal members 16 has a guide 43 positioned at a point being closer to the front end 18 than the back end 20. The guides 43 align the pontoon 26 with the pair of rails 28 while the pontoon 26 is being placed on the trailer 12.

A second support 44 is coupled to the trailer 12 and the second support 44 may support a personal watercraft 46 beneath the pontoon 26. The second support 44 comprises a pair of legs 48 coupled to the lateral members 14 and each of the legs 48 is positioned on opposite sides of the bend 22 in the lateral members 14. Each of the legs 48 is substantially coextensive with the longitudinal members 16. Each of the legs 48 may support the personal watercraft 46 beneath a deck 49 of the pontoon 26 after the pontoon 26 is positioned on the rails 28. Additionally, each of the rails 28 is positionable in the lifted position when the pontoon 26 is on the trailer 12 such that the personal watercraft 46 is removable from the trailer 12. The personal watercraft 46 may be a jet ski or the like, and more than one personal watercraft 46 may be supported on the second support 44. The bend 22 on each of the lateral members 14 allows the personal watercraft 46 to avoid contacting the lateral members 14.

In use, the trailer 12 is utilized to simultaneously transport the pontoon 26 and the personal watercraft 46. The pontoon 26 is positioned on the first support 24. Each of the rails 28 is positioned in the lifted position to allow the personal watercraft 46 to be placed on the second support 44. Each of the rails 28 is positioned in the lowered position and the trailer 12 is used to transport the pontoon 26 and the personal watercraft 46. The personal watercraft 46 may be removed from the trailer 12 without removing the pontoon 26 from the trailer 12. Each of the rails 28 is positioned in the lifted position and the personal watercraft 46 is removed from the trailer 12 while the pontoon 26 remains on the trailer 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer assembly configured to simultaneously transport at least one personal watercraft and a pontoon, said trailer assembly comprising:
   a trailer configured to be towed, said trailer including a pair of longitudinal members and a plurality of lateral members, each of said longitudinal members having a front end and a back end;
   a first support hingedly coupled to said trailer, said first support being configured to support a pontoon, said first support including a pair of rails, each of said rails having a first end and a second end, each of said rails being elongated between said first end and said second end, each of said longitudinal members having a top side, said top side of each of said longitudinal members having one of said rails positioned thereon, said first ends of said rails being respectively aligned with said back ends of said longitudinal members and said second ends of said rails each being positioned at a point closer to said front end of each longitudinal member than said back end of each longitudinal member, said second end of each of said rails being hingedly coupled to said top side of each respective longitudinal member; and
   a second support coupled to said trailer, said second support being configured to support at least one personal watercraft beneath the pontoon when the pontoon is on said trailer.

2. The trailer assembly according to claim 1, wherein each of said rails includes a first member and a second member, said first member and said second member being attached to each other, said first member and said second member being oriented at an angle relative to each other such that said first member and said second member forms a V-shape, said first member and said second member of one of said rails being configured to have one of a pair of floats of the pontoon positioned thereon, said first member and said second member of the other one of said rails being configured to have the other one of the pair of floats of the pontoon positioned thereon.

3. The trailer assembly according to claim 2, wherein each of said rails are positionable in a lifted position such that said first ends of said rails are spaced from said top sides of said longitudinal members, and each of said rails being further positionable in a lowered position such that said rails abut said top sides of said longitudinal members.

4. The trailer assembly according to claim 3, further comprising a pair of lifts, one of said lifts being coupled between one of said lateral members and one of said rails, the other one of said lifts being coupled between another one of said lateral members and the other one of said rails, each of said lifts urging said rails between said lifted position and said lowered position.

5. The trailer assembly according to claim 1, wherein said lateral members are coupled to and extend between the pair of longitudinal members, said lateral members being spaced apart from each other and distributed between said front ends and said back ends of said longitudinal members, each of said lateral members having a bend thereon, said bend being centrally positioned on each of said lateral members such that each of said lateral members has a V-shape, each of said lateral members being oriented such that said bend extends downwardly between said longitudinal members.

6. The trailer assembly according to claim 5, wherein said second support comprises a pair of legs coupled to said lateral members, each of said legs being positioned at opposite sides of each bend in said lateral members, each of said legs being substantially coextensive with said longitudinal members.

7. The trailer assembly according to claim 6, wherein the pair of rails of the first support are positionable in a lifted position; and
   each of said legs of the second support are configured to support the at least one personal watercraft beneath a deck of the pontoon after the pontoon is positioned on said rails, each of said rails being positionable in said lifted position when the pontoon is on said trailer such that the at least one personal watercraft is removable from said trailer.

8. A trailer assembly configured to simultaneously transport at least one personal watercraft and a pontoon, said trailer assembly comprising:
   a trailer configured to be towed, said trailer including a plurality of lateral members coupled to and extending between a pair of longitudinal members, each of said longitudinal members having a front end and a back end, said lateral members being spaced apart from each other and distributed between said front ends and said back ends of said longitudinal members, each of said lateral members having a bend thereon, said bend being centrally positioned on each of said lateral members such that each of said lateral members has a V-shape, each of said lateral members being oriented such that said bend extends downwardly between said longitudinal members;
   a first support hingedly coupled to said trailer, said first support being configured to support a pontoon, said first support comprising
      a pair of rails, each of said rails having a first end and a second end, each of said rails being elongated between said first end and said second end, each of said longitudinal members having a top side, said top side of each of said longitudinal members having one of said rails positioned thereon, said first ends of said rails being respectfully aligned with said back ends of said longitudinal members and said second ends of said rails each being positioned at a point closer to said front end of each longitudinal member than said back end of each longitudinal member, said second end of each of said rails being hingedly coupled to said top side of each respective longitudinal member, each of said rails including a first member and a second member, said first member and said second member being attached to each other, said first member and said second member being oriented at an angle relative to each other such that said first member and said second member forms a V-shape, said first member and said second member of one of said rails being configured to have one of a pair of floats of the pontoon positioned thereon, said first member and said second member of the other one of said rails being configured to have the other one of the pair of floats of the pontoon positioned thereon, each of said rails being positionable in a lifted position such that said first ends of said rails are spaced from said top sides of said longitudinal members, each of said rails being further positionable in a lowered position such that said rails abut said top sides of said longitudinal members, and a pair of lifts, one of said lifts being coupled between one of said lateral members and one of said rails, the other one of said lifts being coupled between another one of said lateral members and the other one of said rails, each of said lifts urging said rails between said lifted position and said lowered position; and a second support coupled to said trailer, said second support being configured to support at least one personal watercraft beneath the pontoon when the pontoon is on said trailer, said second support comprising a pair of legs coupled to said lateral members, each of said legs being positioned at opposite sides of each bend in said lateral members, each of said legs being substantially coextensive with said longitudinal members, each of said legs being configured to support the at least one personal watercraft beneath a deck of the pontoon after the pontoon is positioned on said rails, each of said rails being positionable in said lifted position when the pontoon is on said trailer such that the at least one personal watercraft is removable from said trailer.

* * * * *